(12) United States Patent
Jing et al.

(10) Patent No.: US 10,710,126 B2
(45) Date of Patent: Jul. 14, 2020

(54) CLEANING APPARATUS AND CLEANING METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Fei Liu, Beijing (CN); Zhiwei Xu, Beijing (CN); Xiaopan Che, Beijing (CN); Chuanhui Chen, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/576,542

(22) PCT Filed: May 11, 2017

(86) PCT No.: PCT/CN2017/083972
§ 371 (c)(1),
(2) Date: Nov. 22, 2017

(87) PCT Pub. No.: WO2017/206694
PCT Pub. Date: Dec. 7, 2017

(65) Prior Publication Data
US 2019/0217348 A1    Jul. 18, 2019

(30) Foreign Application Priority Data

Jun. 1, 2016  (CN) .......................... 2016 1 0384100

(51) Int. Cl.
*B08B 7/02*       (2006.01)
*G02F 1/13*       (2006.01)
*B08B 7/00*       (2006.01)

(52) U.S. Cl.
CPC .............. *B08B 7/02* (2013.01); *B08B 7/0071* (2013.01); *B08B 7/0092* (2013.01); *G02F 1/1303* (2013.01); *G02F 2001/1316* (2013.01)

(58) Field of Classification Search
CPC ....... B08B 7/02; B08B 7/0071; B08B 7/0092; G02F 1/1303; G02F 2001/1316
(Continued)

(56) References Cited

U.S. PATENT DOCUMENTS 5,989,355 A   11/1999   Brandt et al.
6,003,527 A   12/1999   Netsu et al.
(Continued)

FOREIGN PATENT DOCUMENTS

CN   1188326 A   7/1998
CN   1494114 A   5/2004
(Continued)

OTHER PUBLICATIONS

First Office Action for Chinese Application No. 201610384100.8, dated Jan. 4, 2018, 6 Pages, 14 pages total in file.
(Continued)

*Primary Examiner* — Michael E Barr
*Assistant Examiner* — Tinsae B Ayalew
(74) *Attorney, Agent, or Firm* — Brooks Kushman P.C.

(57) ABSTRACT

A cleaning apparatus and a cleaning method are provided. The cleaning apparatus is used for removing a residue on a substrate, and includes: a deformable device arranged on the substrate; and an excitation device configured to generate an excitation source for the deformable device, so as to enable the deformable device to be deformed under the effect of the
(Continued)

excitation source, thereby to drive the substrate to vibrate and enable the residue to fall off from the substrate.

17 Claims, 2 Drawing Sheets

(58) Field of Classification Search
USPC .......................................................... 134/137
See application file for complete search history.

(56) References Cited

U.S. PATENT DOCUMENTS

| | | |
|---|---|---|
| 6,500,268 B1 | 12/2002 | Henley |
| 6,565,669 B1 * | 5/2003 | Bohon, III ................ B08B 6/00 134/1 |
| 2004/0140499 A1 | 7/2004 | Sato et al. |
| 2009/0050175 A1 | 2/2009 | Tanaka et al. |
| 2014/0216508 A1 | 8/2014 | Korbler |
| 2015/0027490 A1 | 1/2015 | Sun |
| 2016/0201984 A1 | 7/2016 | Ma et al. |

FOREIGN PATENT DOCUMENTS

| | | |
|---|---|---|
| CN | 1510721 A | 7/2004 |
| CN | 1600454 A | 3/2005 |
| CN | 101373706 A | 2/2009 |
| CN | 101402095 A | 4/2009 |
| CN | 103341405 A | 10/2013 |
| CN | 104624554 A | 5/2015 |
| CN | 105142808 A | 12/2015 |
| CN | 106076980 A | 11/2016 |
| JP | H06310483 A | 11/1994 |
| KR | 101388505 B1 | 4/2014 |

OTHER PUBLICATIONS

International Search Report and Written Opinion for Application No. PCT/CN2017/083972, dated Aug. 21, 2017, 10 Pages, 18 pages total in file.

* cited by examiner

CLEANING APPARATUS AND CLEANING METHOD

CROSS-REFERENCE TO RELATED APPLICATION

This application is the U.S. national phase of PCT Application No. PCT/CN2017/083972 filed on May 11, 2017, which claims priority to Chinese Patent Application No. 201610384100.8 filed on Jun. 1, 2016, the disclosures of which are incorporated in their entirety by reference herein.

TECHNICAL FIELD

The present disclosure relates to the field of a display device manufacture, and in particular to a cleaning apparatus and a cleaning method.

BACKGROUND

Along with the development of the flat-panel display technology, a Liquid Crystal Display (LCD) has been successfully applied to such a display device as notebook computer, monitor or television. Currently, the LCD has become a mainstream product for information display, and its display quality is continuously improved along with the improvement in the manufacture process.

During the manufacture of an LCD panel, in order to enable liquid crystal molecules to be aligned accurately, it is necessary to coat a polyimide (PI) film onto a surface of an array substrate and a color filter substrate, and then rub the PI film. Hence, a coating process for coating the PI film onto the array substrate and the color filter substrate is very important.

A coating device in the related art mainly includes a frame, a transfer plate, a wheel, a roller and a working table. A glass substrate (e.g., the array substrate or the color filter substrate) is placed onto the working table, and then the transfer plate wrapped onto the roller is in contact with the glass substrate. At this time, due to a transmission function of the working table, the glass substrate is moved on the working table and meanwhile the roller rotates, so as to coat a PI liquid on the transfer plate onto the glass substrate, thereby to form the PI film. Currently, a foreign substance on the transfer plate is removed manually by an operator who enters the coating device. However, through this method, it is impossible to ensure the complete removal of the foreign substance, and thereby the subsequent coating of the PI film may be adversely affected.

SUMMARY

An object of the present disclosure is to provide a cleaning apparatus and a cleaning method, so as to effectively remove a residue on a substrate after being manually cleaned.

In one aspect, the present disclosure provides in some embodiments a cleaning apparatus for removing a residue on a substrate, including: a deformable device arranged on the substrate; and an excitation device configured to generate an excitation source for the deformable device, so as to enable the deformable device to be deformed under the effect of the excitation source, thereby to drive the substrate to vibrate and remove the residue from the substrate.

Optionally, the deformable device is an elastic cavity, the excitation source is a gas or liquid, and the excitation device is configured to supply the gas or liquid into the elastic cavity, so as to enable the elastic cavity to be deformed, thereby to drive the substrate to vibrate and remove the residue from the substrate.

Optionally, the deformable device is an expandable film having an expansion coefficient varying with a temperature, and the excitation source is configured to change the temperature of the expandable film. The expandable film is capable of being expanded in the case of being heated and contracted in the case of being cooled under the effect of the excitation source, thereby to drive the substrate to vibrate and remove the residue from the substrate.

Optionally, the expandable film is at least partially made of plastic fiber.

Optionally, the plastic fiber is polyhexamethylene adipamide fiber.

Optionally, a suction disc is on a surface of the expandable film, and the expandable film is adsorbed onto the substrate through the suction disc.

Optionally, the excitation source is a gas, and the excitation device includes a temperature controller configured to supply gases at different temperatures, so as to heat and cool the substrate provided with the expandable film recurrently.

Optionally, the cleaning apparatus further includes an electrostatic device opposite to the substrate and configured to ionize the substrate and the residue, so as to enable the substrate and the residue to carry charges having an identical polarity.

Optionally, the cleaning apparatus further includes: a cleaning cavity the temperature controller and the substrate provided with the deformable device are within the cleaning cavity; and a gas cycling device arranged on a wall of the cleaning cavity and configured to discharge the gases at different temperatures supplied by the temperature controller, so as to enable the gas to flow into and out of the cleaning cavity.

Optionally, the cleaning apparatus further includes a discharge slot arranged within the cleaning cavity and configured to discharge the residue fallen off from the substrate.

Optionally, two side edge portions of the expandable film are fixed to two side edge portions of the substrate respectively and made of the plastic fiber.

Optionally, the expandable film is fixed to the substrate through glue.

Optionally, the suction disc is arranged at a peripheral region of the expandable film.

Optionally, the cleaning apparatus further includes at least two electrostatic devices opposite to each other, and each electrostatic device is arranged opposite to the substrate and configured to ionize the substrate and the residue, so as to enable the substrate and the residue to carry charges having an identical polarity.

Optionally, the temperature controller is on a wall of the cleaning cavity opposite to the gas cycling device.

Optionally, the electrostatic devices are arranged on two walls of the cleaning cavity perpendicular to the wall on which the gas cycling device is arranged.

Optionally, the cleaning apparatus further includes a bracket within the cleaning cavity and between the temperature controller and the gas cycling device. The bracket includes a plurality of support plates arranged in a vertical direction, and each support plate is configured to support the substrate provided with the expandable film and arranged perpendicular to the wall of the cleaning cavity on which the gas cycling device is arranged.

In another aspect, the present disclosure provides in some embodiments a cleaning method for removing a residue on a substrate. A deformable device is arranged on the substrate and capable of being deformed under an effect of an excitation source. The cleaning method includes: generating the excitation source for the deformation device, so as to enable the deformable device to be deformed under the effect of the excitation source, thereby to drive the substrate to vibrate and remove the residue from the substrate.

Optionally, the deformable device is an expandable film having an expansion coefficient varying with a temperature, and the generating the excitation source for the deformable device includes: heating and cooling the substrate provided with the expandable film recurrently, so as to enable the expandable film to be expanded in the case of being heated and contracted in the case of being cooled, thereby to drive the substrate to vibrate and remove the residue from the substrate.

Optionally, the excitation source is a gas, and the excitation device includes a temperature controller configured to supply gases at different temperatures, so as to heat and cool the substrate provided with the expandable film recurrently, to blow away the residue from the substrate.

According to the embodiments of the present disclosure, the deformable device is arranged on the substrate and capable of being deformed under the effect of the excitation source, so as to drive the substrate to vibrate gently and remove the residue from a surface of the substrate without damaging the substrate, thereby to improve a cleaning effect.

DETAILED DESCRIPTION

Figure 1:
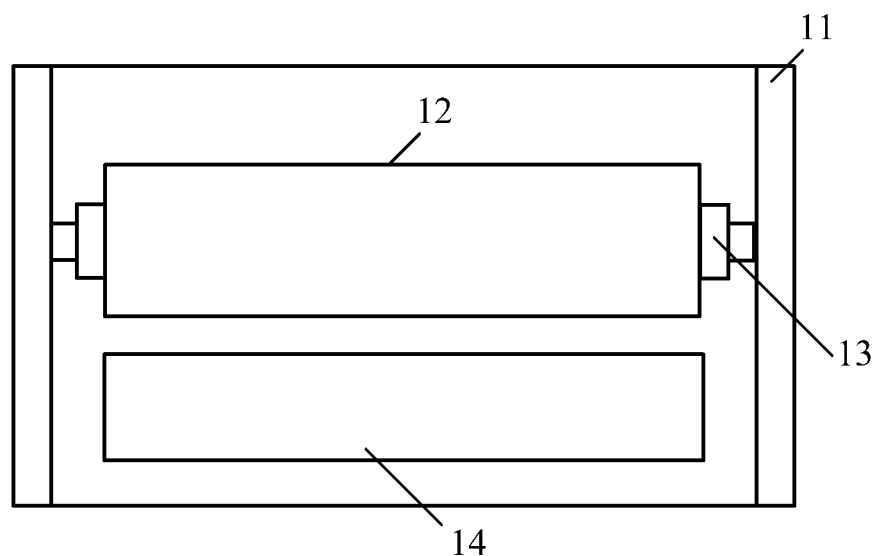
FIG. 1 is a schematic view showing a coating device for coating a PI film in the related art.

As shown in FIG. 1, a coating device in the related art mainly includes a frame 11, a transfer plate 12, a wheel (not shown), a roller 13 and a working table 14. The roller 13 is fixed onto a side wall of the frame 11 and rotated so as to drive a wheel connected thereto to rotate. In FIG. 1, the rectangular transfer plate 12 is wrapped onto a surface of the roller and supported by a flexible material. The transfer plate 12 is provided at its surface with a plurality of pits arranged in a net form at a density of 400 line/inch, and each pit has an inclination angle of 45°, so as to coat a PI liquid onto the transfer plate 12 uniformly. A glass substrate (e.g., an array substrate or a color filter substrate) is placed onto the working table 14, and then it is in contact with the transfer plate 12 wrapped onto the roller. At this time, due to a transmission function of the working table 14, the glass substrate is moved on the working table and meanwhile the roller rotates, so as to coat the PI liquid on the transfer plate 12 to the glass substrate, thereby to form a PI film.

In the case that a foreign substance occurs on the PI film or the PI film is not coated uniformly, display quality of a resultant LCD panel may be seriously adversely affected, and meanwhile a waste of material may occur. Usually, prior to coating the array substrate or the color filter substrate, the PI film may be coated to a dummy glass substrate at first. After the coating, the dummy glass substrate may be checked using a checking machine and then using a Mac/Mic microscope, so as to determine whether or not the PI film is coated uniformly or whether or not there is the foreign substance. In the case that there is the foreign substance, it is necessary to clean the transfer plate so as to remove the foreign substance from the transfer plate. Then, the dummy glass substrate is checked again, until no abnormality occurs. Next, the array substrate or the color filter substrate is coated. Currently, the foreign substance on the transfer plate is cleaned manually by an operator who enters the coating device. However, through this method, it is impossible to ensure the complete removal of the foreign substance, and thereby the subsequent coating of the PI film may be adversely affected.

In order to make the technical problems, the technical solutions and the advantages of the present disclosure more apparent, the present disclosure will be described hereinafter in conjunction with the drawings and embodiments.

In order to solve the technical issue that residue may be remained after the manual cleaning, the present disclosure provides a cleaning apparatus and a cleaning method.

The present disclosure provides in some embodiments a cleaning apparatus for removing a residue on a substrate.

Figure 2:
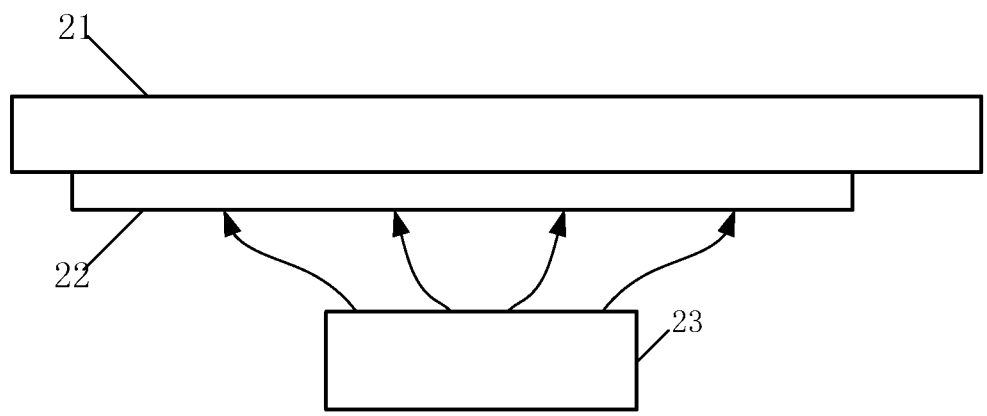
FIG. 2 is a schematic view showing a cleaning apparatus in some embodiments of the present disclosure.

As shown in FIG. 2, a deformable device 22 is adhered onto a surface of the substrate 21. Optionally, the deformable device 22 may be adhered onto a surface of the substrate where no functional pattern is arranged. The deformable device 22 is capable of being deformed under the effect of an excitation source.

Correspondingly, in some embodiments of the present disclosure, the cleaning apparatus includes an excitation device 23 configured to generate the excitation source for the deformable device 22, so as to enable the deformable device 22 to be deformed, thereby to drive the substrate 21 to vibrate and remove the residue from the substrate 21.

In some embodiments of the present disclosure, due to the deformation of the deformable device, it is able to drive the substrate to vibrate at a large amplitude, so as to effectively remove the residue from the substrate. In addition, the vibration generated due to the deformation is relatively gentle, so it is able to prevent the substrate and a functional pattern on a surface of the substrate from being damaged.

In actual use, a transfer plate of a PI film coating device needs to be cleaned completely, and after being manually cleaned, some particles may still remain on the transfer plate. Hence, the cleaning apparatus in the embodiments of the present disclosure may be used to further clean the transfer plate which has been cleaned manually, without damaging a net-like frictional surface of the transfer plate. In this way, it is able to ensure a coating quality of the PI film, thereby to improve the yield of the display product.

Of course, during the implementation, the deformable device may be implemented in various ways. For example, in some embodiments of the present disclosure, the deformable device may be an elastic cavity, and the corresponding excitation source may be a gas or liquid. The excitation device is configured to supply the gas or liquid into the elastic cavity, so as to enable the elastic cavity to be deformed, thereby to drive the substrate to vibrate. In some other embodiments of the present disclosure, the deformable device may be an expandable film having an expansion coefficient varying along with a temperature, and the corresponding excitation resource is the temperature. The excitation device is configured to adjust the temperature, so as to enable the expandable film to be expanded in the case of being heated and contracted in the case of being cooled, thereby to drive the substrate to vibrate. Regardless of the deformation modes, it should be appreciated that, any technical solution where the deformable device is deformed so as to drive the substrate to vibrate and enable the residue to fall off from the substrate shall fall within the scope of the present disclosure.

The expandable film in the embodiments of the present disclosure will be described hereinafter in more details in the case that the residue on the transfer plate is to be removed.

Figure 3:
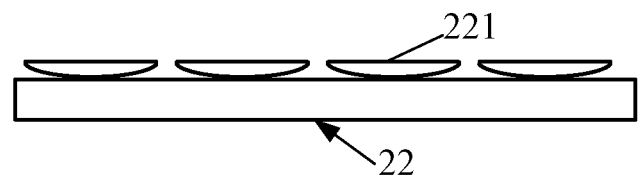
FIG. 3 is a schematic view showing an expandable film provided with a suction disc in some embodiments of the present disclosure.

Optionally, the expandable film may be at least partially made of plastic fiber, e.g., polyhexamethylene adipamide fiber. As shown in FIG. 3, the expandable film 22 is provided at a side, onto which the transfer plate is adhered. In some embodiments of the present disclosure, the expandable film 22 is adsorbed onto the transfer plate through a suction disc 221 at a side of the expandable film 22.

It should be appreciated that, FIG. 3 merely illustratively shows the suction disc, and in actual use, the suction disc may include a plurality of grooves uniformly arranged at one side of the expandable film. In the case that the expandable film on the transfer plate is pressed, the air may be pushed out from each groove, so as to enable the expandable film to be vacuum-adsorbed onto the transfer plate.

Further, in some embodiments of the present disclosure, the expandable film has a shape corresponding to the transfer plate, i.e., it is of a rectangular shape. Two sides of the expandable film are fixedly connected to two sides of the substrate. In the case being heated and cooled recurrently, the expandable film may be deformed, so as to pull the two sides of the transfer plate, thereby to enable the two sides of the transfer plate to be curved upward and remove the residue there from. In some other embodiments of the present disclosure, one side of the expandable film may be immovably fixed onto the transfer plate, and the other side may be adsorbed onto the transfer plate through the suction disc. During the deformation, the side of the expandable film with the suction disc may be close to or away from the other side, so a tensile force applied by the expandable film to the transfer plate and its direction may vary with the deformation. As a result, it is able to improve the removal effect of the residue.

Of course, the above is merely an illustrative example of the expandable film. In actual use, an area of the suction disc may be appropriately set in accordance with strength of the transfer plate. For example, for the transfer plate with large strength, the expandable film may be provided with a large-size suction disc, so as to enable the expandable film to be almost completely adsorbed onto the transfer plate. At this time, during the expansion and contraction, it is able for the expandable film to drive the transfer plate to vibrate fiercely, so as to acquire a better cleaning effect. For the transfer plate with small strength, the suction disc may be arranged at a peripheral region of the expandable film. At this time, it is able for the expandable film, at its edge, to drive the transfer plate to vibrate, so as to prevent the transfer plate from being damaged.

It should be appreciated that, in some other embodiments of the present disclosure, the expandable film may not be provided with any suction disc, and instead, it may be fixed onto the transfer plate through glue.

In addition, in some embodiments of the present disclosure, the expandable film may be partially or completely made of plastic fiber. For example, portions of the expandable film connected to the transfer plate at two sides may be made of the plastic fiber, and during the temperature adjustment, mainly these portions of the expandable film are expanded in the case of being heated and contracted in the case of being cooled, so as to improve a pulling effect of the transfer plate.

The entire design of the cleaning apparatus will be described hereinafter in more details.

Figure 4:
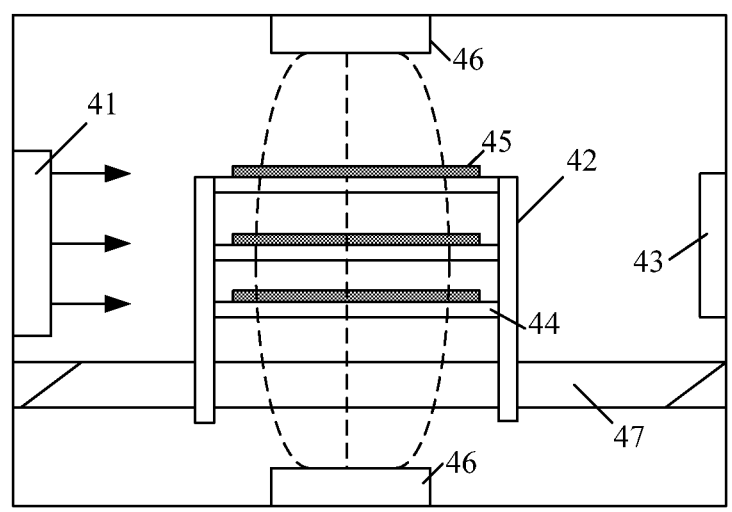
FIG. 4 is a schematic view showing the cleaning apparatus in some embodiments of the present disclosure.

As shown in FIG. 4, the cleaning apparatus includes a cleaning cavity in which a temperature controller 41 (i.e., the above-mentioned excitation device), a bracket 42 and a gas cycling device 43 are arranged. The bracket 42 includes a plurality of support plates 44 arranged in a vertical direction, and each support plate 44 is configured to support the transfer plate 45 having the expandable film.

In FIG. 4, the bracket 42 is arranged between the temperature controller 41 and the gas cycling device 43 and perpendicular to the wall of the cleaning cavity on which the gas cycling device 43 is arranged.

The temperature controller 41 is arranged at a side of the bracket 42, and the gases (usually air) at different temperatures is supplied to the transfer plate 45 on the bracket 42 along a direction indicated by the arrow shown in FIG. 4, so as to heat and cool the transfer plate 45 with the expandable film recurrently.

The gas cycling device 43 is arranged on a wall of the cleaning cavity and configured to discharge the gas supplied by the temperature controller 41, so as to enable the gas to flow into and out of the cleaning cavity.

In FIG. 4, the temperature controller 41 is arranged on a wall of the cleaning cavity opposite to the gas cycling device 43.

In addition, in order to facilitate the removal of the residue from the transfer plate, in some embodiments of the present disclosure, the cleaning apparatus further includes an electrostatic device 46 arranged opposite to the transfer plate 45 and configured to generate an electrostatic field, so as to ionize the transfer plate 45 and the residue on the surface of the transfer plate 45, thereby to enable the substrate and the residue to carry charges having an identical polarity and enable them to repel each other. In actual use, the electrostatic device 46 may be an electrode which is energized so as to generate a strong electrostatic field.

In FIG. 4, the cleaning apparatus includes at least two electrostatic devices 46 arranged opposite to each other, and arranged on two walls of the cleaning cavity perpendicular to the wall on which the gas cycling device 43 is arranged.

In actual use, the cleaning apparatus further includes a discharge slot 47 arranged within the cleaning cavity and configured to discharge the residue that has fallen off from the transfer plate. Optionally, the discharge slot may be a water slot arranged below the transfer plate 45. The residue may fall off from the transfer plate 45 and into the water slot, and then be discharged together with the water in the water slot, so as to prevent the residue from being volatized into the cleaning cavity.

In a word, the cleaning apparatus in the embodiments of the present disclosure has the following advantages. (1) Through a blowing mode, the expandable film is expanded in the case of being heated and contracted in the case of being cooled, and the residue may be blown off from the transfer plate to some extent, so it is able improve the cleaning effect of the transfer plate. (2) Through the electrostatic field, it is able to provide the transfer plate and the residue with the charges having an identical polarity, so as to enable the transfer plate and the residue to repel each other, thereby to facilitate the removal of the residue. (3) Through the bracket, it is able to place a plurality of to-be-cleaned transfer plate in the vertical direction, and it is able for the temperature controller to supply the air toward the transfer plates from a side of the bracket at the same time, thereby to improve the cleaning efficiency. For a large-scale production line, the high working efficiency corresponds to a high utilization rate. In addition, the wind in a lateral direction may blow the residue off from the transfer plate, so as to facilitate the cleaning operation. (4) After the cleaning, the operator may directly store the bracket with the transfer plates in a warehouse for the next coating operation of the PI film.

The present disclosure further provides in some embodiments a cleaning method for removing a residue on a substrate. A deformable device is arranged on the substrate and capable of being deformed under the effect of an excitation source. The cleaning method includes a step of generating the excitation source for the deformation device, so as to enable the deformable device to be deformed under the effect of the excitation source, thereby to drive the substrate to vibrate and enable the residue to fall off from the substrate.

According to the cleaning method in the embodiments of the present disclosure, the deformable device is deformed under the effect of the excitation source, and during the deformation, the substrate is driven to vibrate gently. As a result, it is able to remove the residue from the surface of the substrate without damaging the substrate, thereby to improve the cleaning effect.

During the implementation, the deformable device may be an expandable film having an expansion coefficient varying along with a temperature. In some embodiments of the present disclosure, the substrate with the expandable film may be heated and cooled recurrently, so as to enable the expandable film to be expanded in the case of being heated and contracted in the case of being cooled, thereby to drive the substrate to vibrate and enable the residue to fall off from the substrate.

Optionally, gases at different temperatures may be supplied to the substrate with the expandable film, so as to heat and cool the expandable film recurrently. In this way, it is able to further blow the residue off from the substrate, thereby to improve the cleaning effect.

Obviously, the cleaning method corresponds to the above-mentioned cleaning apparatus, and thus an identical technical effect may be achieved.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A cleaning apparatus for removing a residue on a substrate, comprising:
    a deformable device on the substrate; and
    an excitation device configured to generate an excitation source for the deformable device, to enable the deformable device to be deformed under an effect of the excitation source and to drive the substrate to vibrate and remove the residue from the substrate;
    wherein the deformable device is an expandable film having an expansion coefficient varying with temperature, the excitation source is configured to change the temperature of the expandable film, and the expandable film is capable of being expanded in the case of being heated and contracted in the case of being cooled under the effect of the excitation source, to drive the substrate to vibrate and remove the residue from the substrate.

2. The cleaning apparatus according to claim 1, wherein the expandable film is at least partially made of plastic fiber.

3. The cleaning apparatus according to claim 2, wherein the plastic fiber is polyhexamethylene adipamide fiber.

4. The cleaning apparatus according to claim 1, wherein a suction disc is on a surface of the expandable film, and the expandable film is adsorbed onto the substrate through the suction disc.

5. The cleaning apparatus according to claim 1, wherein the excitation source is a gas, and the excitation device comprises a temperature controller configured to supply gases at different temperatures to heat and cool the substrate provided with the expandable film recurrently.

6. The cleaning apparatus according to claim 1, further comprising an electrostatic device opposite to the substrate and configured to ionize the substrate and the residue, to enable the substrate and the residue to carry charges having an identical polarity.

7. The cleaning apparatus according to claim 5, further comprising:
    a cleaning cavity, the temperature controller and the substrate provided with the deformable device are within the cleaning cavity; and a gas cycling device arranged on a wall of the cleaning cavity and configured to discharge the gases at different temperatures supplied by the temperature controller, to enable the gas to flow into and out of the cleaning cavity.

8. The cleaning apparatus according to claim 7, further comprising a discharge slot within the cleaning cavity and configured to discharge the residue fallen off from the substrate.

9. The cleaning apparatus according to claim 3, wherein two side edge portions of the expandable film are fixed to two side edge portions of the substrate respectively and made of the plastic fiber.

10. The cleaning apparatus according to claim 1, wherein the expandable film is fixed to the substrate through glue.

11. The cleaning apparatus according to claim 4, wherein the suction disc is at a peripheral region of the expandable film.

12. The cleaning apparatus according to claim 7, further comprising at least two electrostatic devices opposite to each other, and each electrostatic device is arranged opposite to the substrate and configured to ionize the substrate and the residue, to enable the substrate and the residue to carry charges having an identical polarity.

13. The cleaning apparatus according to claim 7, wherein the temperature controller is on a wall of the cleaning cavity opposite to the gas cycling device.

14. The cleaning apparatus according to claim 12, wherein the electrostatic devices are arranged on two walls of the cleaning cavity perpendicular to the wall on which the gas cycling device is arranged.

15. The cleaning apparatus according to claim 7, further comprising a bracket within the cleaning cavity and between the temperature controller and the gas cycling device, wherein the bracket comprises a plurality of support plates arranged in a vertical direction, and each support plate is configured to support the substrate provided the expandable film and arranged perpendicular to the wall of the cleaning cavity on which the gas cycling device is arranged.

16. A cleaning method for removing a residue on a substrate, wherein a deformable device is on the substrate and capable of being deformed under an effect of an excitation source, and the cleaning method comprises:
    generating the excitation source for the deformation device, to enable the deformable device to be deformed under the effect of the excitation source and to drive the substrate to vibrate and remove the residue from the substrate;

wherein the deformable device is an expandable film having an expansion coefficient varying with temperature, and the generating the excitation source for the deformable device comprises:

heating and cooling the substrate provided with the expandable film recurrently, to enable the expandable film to be expanded in the case of being heated and contracted in the case of being cooled, to drive the substrate to vibrate and remove the residue from the substrate.

17. The cleaning method according to claim 16, wherein the excitation source is a gas, and an excitation device comprises a temperature controller configured to supply gases at different temperatures to heat and cool the substrate provided with the expandable film recurrently, to blow away the residue from the substrate.

* * * * *